Oct. 11, 1960

C. E. McWHORTER ET AL 2,955,810

CUTTING DEVICE FOR THE CONTINUOUS
CUTTING OF COAL AND THE LIKE

Original Filed Dec. 16, 1957

INVENTOR.
Cedric E. McWhorter
John S. Newton
BY
Murray A. Gleeson
ATTORNEY

Oct. 11, 1960

C. E. McWHORTER ET AL 2,955,810
CUTTING DEVICE FOR THE CONTINUOUS
CUTTING OF COAL AND THE LIKE

Original Filed Dec. 16, 1957

INVENTOR.
Cedric E. McWhorter
John S. Newton
BY
Murray A. Gleeson
ATTORNEY

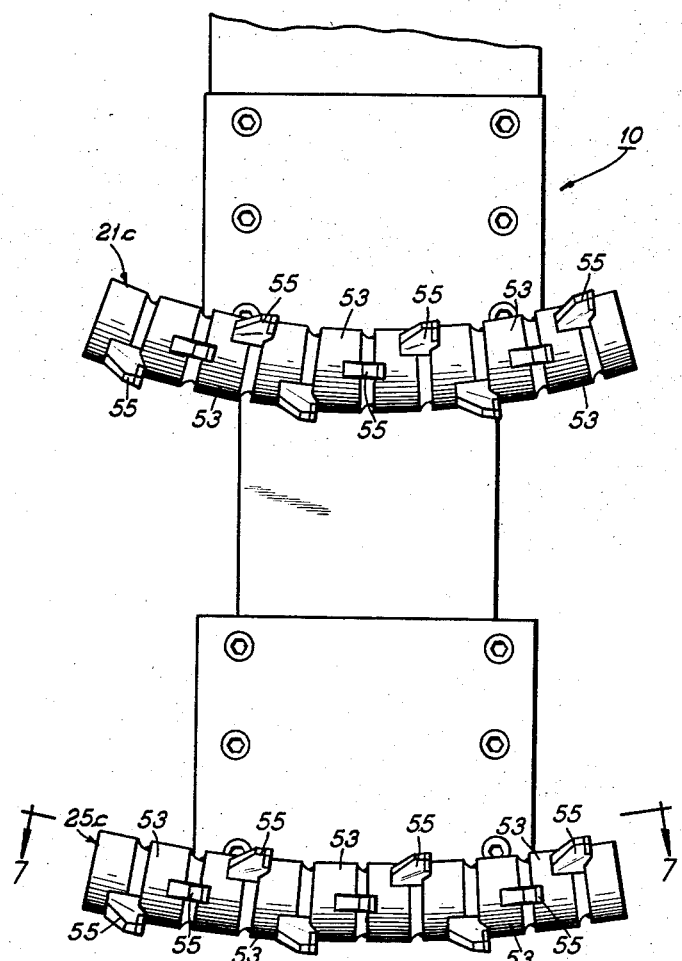
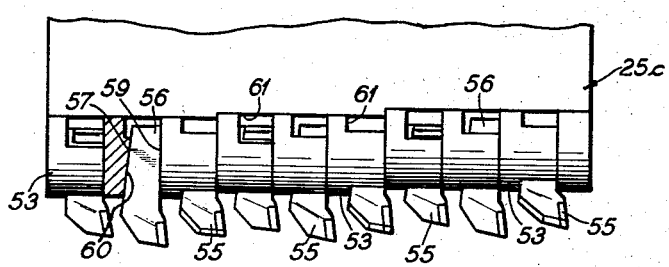
Fig. 6
Fig. 7
INVENTOR.
Cedric E. McWhorter
John S. Newton
BY Murray G. Gleeson
ATTORNEY

United States Patent Office 2,955,810
Patented Oct. 11, 1960

2,955,810

CUTTING DEVICE FOR THE CONTINUOUS CUTTING OF COAL AND THE LIKE

Cedric E. McWhorter, Hinsdale, and John S. Newton, Glen Ellyn, Ill., assignors to Goodman Manufacturing Company, Chicago, Ill., a corporation of Illinois Continuation of application Ser. No. 703,079, Dec. 16, 1957. This application May 11, 1959, Ser. No. 812,536

8 Claims. (Cl. 262—33)

This invention relates to devices for cutting coal and the like and more particularly relates to cutters so positioning the cutting means as to provide a cutting pattern for increasing the proportion of lump coal and cutting through hard inclusions, such as sulphur balls and the like in seams of coal.

This application is a continuation of my application Serial No. 703,079 filed December 16, 1957, now abandoned.

Naturally occurring mineral substances and particularly seams of coal are frequently of a heterogeneous composition having bands of harder and softer substances occurring in layers or having hard inclusions interspersed in the softer coal. A specific example is where very hard iron pyrite inclusions, commonly called sulphur balls, are found in a relatively softer seam of coal, which may consist in laminations of coal and slate of various hardnesses.

In present day high production continuous mining techniques, where the coal is cut from the solid and loaded during the cutting operation, it is considered good practice to have as few cutter bits or other cutting means contacting the coal as possible. This is to assure that each cutting means will have a maximum depth penetrating force to tear the coal from the seam in the form of lumps or grains rather than grind the coal from the seam as dust.

The cutting means, such as the cutter bits used on continuous mining machines are usually tipped with an abrasive resistant hard cutting material, such as a tungsten carbide and are capable of cutting either the soft coal or the harder inclusions, such as sulphur balls and the like. The effective depth of penetration of the bit in a hard inclusion, however, may only be 25% as much as in the softer substance.

Thus, where the bits are patterned to provide a wide spacing between the bits to contact as few of the bits with the coal as possible, when an individual bit cutting in soft coal at normal depth penetration encounters a hard inclusion, the bit will engage the hard inclusion at too great a depth penetration and will frequently break off or distort to such an extent that the bond between the cutting tip of the bit and the head thereof will be destroyed, with a consequent loss of the cutting tip.

Thus with such a bit arrangement when the bit is traveling in the softer coal at full penetration depth, its cutting depth is too great to cut in the hard inclusion, with the result that where the bit or its tip breaks off the cutting action of the bit is lost. The remaining portion of the bit drags in the kerf, increasing the load on the block carrying the bit with a resultant heating of the block, and frequently damaging the block and the drive mechanism therefor.

In carrying out the present invention, the bits are arranged on the cutter or mounting block into groups of bits located in successive tiers in which the trailing tier is first to contact the material and the leading tier is last to contact the material. The trailing tier of bits will then penetrate the material to their proper working depth while the next preceding tier of bits will normally be held in reserve. In spacing the tiers of bits with respect to each other, the rate of advance of the cutter into the material determines the gage of the bits. The trailing tier of bits is thus spaced to penetrate the material to the required cutting depth in accordance with the rate of advance of the cutter into the material, while the next preceding tiers of bits are spaced by their blocks or cutter to cut at less than the gage of the trailing tier of bits, and thereby penetrate the material after the trailing tier of bits has penetrated the material to the full cutting depth. The preceding tiers of bits thus cut clearance for the trailing tier of bits, and enable the trailing tier of bits to cut to their correct cutting depth or gage.

Thus, where the trailing tier of bits is cutting to the proper depth, the bits of some of the preceding tiers may not normally engage the material, but will become effective to engage hard inclusions, such as sulphur balls and the like, encountered in the softer matrix-like material. Under such conditions, the leading tiers of bits coming into engagement with the harder inclusion will momentarily retard the cutter advance so the hard inclusion is initially cut at less than full cutting depth by a number of passes of the leading tiers of bits while the final cuts are made by the trailing tier of bits during each revolution of the cutter. In this instance the trailing tier of bits will cut the inclusion at less than gage, since the advance of the cutter has been retarded by engagement of the leading tiers of bits with the hard inclusions.

The bit arrangement of our invention which will be more fully described in the following description has resulted in a reduction in bit cost and cutter maintenance cost up to one-third of previous costs.

It is, accordingly, a principal object of the present invention to improve upon the cutters previously used for the continuous mining of coal and the like by providing a cutter so arranged as to support the cutting means thereon in such a pattern that a greater proportion of lump coal will be produced than formerly and the hard inclusions in the coal seam will be cut without undue stress on the cutting means.

A further object of the invention is to provide a new and improved form of rotary cutter for continuous mining machines and the like having bit patterns positioning the trailing cutting means to normally perform the cutting operation and normally holding the leading cutting means in reserve.

Still another object of the invention is to provide an improved form of rotary cutter for coal and the like positioning the bits in a bit pattern in which the depth of penetration of the trailing bits in a hard inclusion is determined by the gage of the preceding bits.

These and other objects and advantages of the invention will appear from time to time as the following specification proceeds and with reference to the accompanying drawings, wherein:

Figure 6 is a fragmentary front elevational view somewhat similar to Figure 4, but showing still another embodiment of the invention, in which each bit is mounted in an individual mounting block; and Figure 7 is a plan view looking in the direction of the arrows 7—7 of Figure 6, with certain parts broken and certain other parts shown in section.

Figure 1:
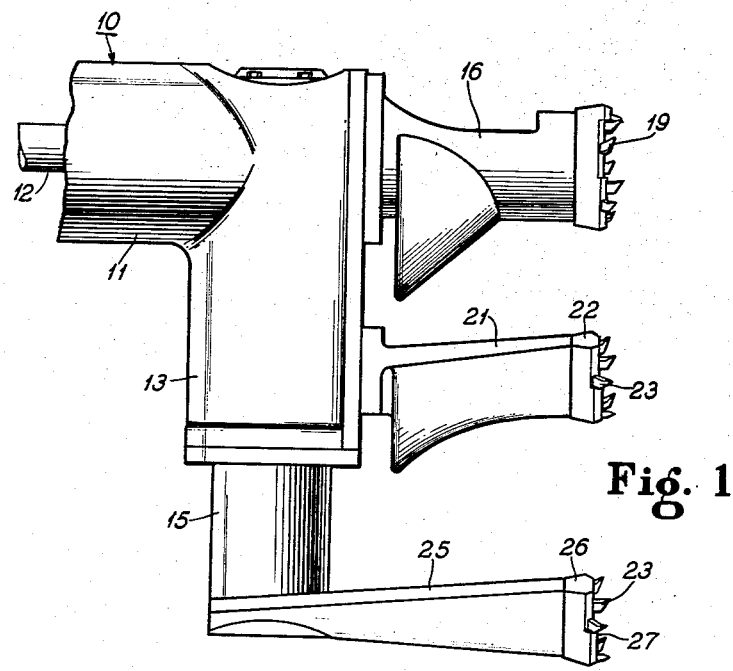
Figure 1 is a fragmentary view in side elevation of a boring head of a type commonly used on boring types of continuous mining machines having a plurality of spaced cutters projecting forwardly therefrom and showing the cutter bits supported in bit patterns in accordance with principles of the present invention.

In the embodiment of the invention illustrated in the drawings, reference numeral 10 generally designates a rotatable boring head of a boring type of continuous mining machine. The boring head 10 may be of a well known form commonly used in boring types of continuous mining machines making boring cuts in a coal face upon rotatable movement of the boring head as it is fed axially into the coal face, so need only herein be shown and described in sufficient detail to render the present invention readily understandable.

The boring head 10, as herein shown, has a central hub 11 mounted on a drive shaft 12, rotatably mounted on the support frame (not shown) for the continuous mining machine and driven through a suitable gear reduction train (not shown) journaled in the support frame for the continuous mining machine. The boring head 10 has an arm 13 extending radially from the hub 11 having an arm 15 telescopically mounted therein and extensible and retractible with respect thereto to vary the cutting radius of the boring head and the diameter of the bore, as shown and described in Patent No. 2,772,870 which issued to Edward L. Anderson and Emil Hlinsky on December 4, 1956, and no part of the present invention so not herein shown or described further.

The boring head 10 also has a pilot cutter 16 extending forwardly therefrom having an annular bit supporting block on the forward end thereof, supporting a plurality of cutter bits 19 in an annular pattern, as shown in Figure 1. The arm 13 also has a segmental cutter 21 spaced radially outwardly from the pilot cutter 16 and extending forwardly therefrom. The segmental cutter 21 has a bit block 22 at the forward end thereof, forming a support for a plurality of cutting means, which may be of any well known form, but which are herein shown as being cutter bits 23, supported in tiers of repeating bit patterns advancing toward the coal face from the leading to the trailing end of the cutter in accordance with the principles of the present invention.

The extensible arm 15 is shown as having a segmental cutter 25 mounted on the end thereof and extending forwardly therefrom. The segmental cutter 25 has a segmental bit mounting block 26 like the block 22 suitably mounted on the forward end thereof for supporting a plurality of cutter bits 23 in repeating bit patterns arranged in tiers extending outwardly or forwardly from the axis of the arm 15 and spaced progressively toward the face to be bored at predetermined increments in length from the advance to the trailing tiers of bits.

Figure 3:
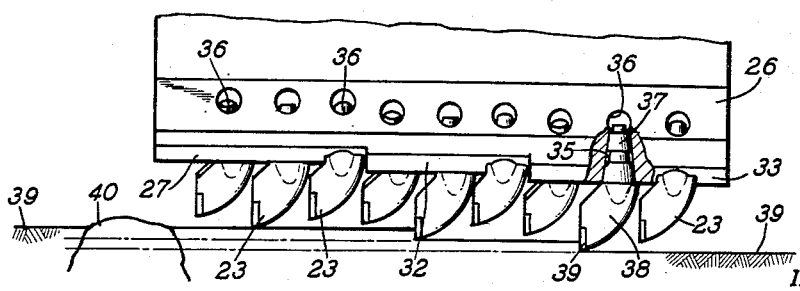
Figure 3 is a plan view of the cutter shown in Figure 2 looking at the cutter in the direction of the arrows 3—3 of Figure 2.

The mounting blocks 22 and 26 and the bits 23 carried thereby are of a similar construction, so the mounting block 26 only need herein be shown and described in detail. The mounting block 26 is in the general form of the segment of a circle, the arc of the segment of which is struck from the center of rotation of the hub 11. The mounting block 26 has a stepped outer face 27 having a leading end central plane face 29 extending generally parallel to the working face and forming a mounting for a center bit 23, and having inclined faces 30 inclined inwardly from opposite sides of said central face, and forming mountings for angularly disposed bits 23, inclined at opposite angles with respect to the center bit 23 to cut clearance for the mounting block 26 and the next succeeding bits mounted thereon. The mounting block 26 has a next succeeding central plane face 31 stepped outwardly or forwardly from the face 29 toward the face to be bored and with oppositely inclined faces 32 supporting a next succeeding tier of bits 23 having a pattern like the pattern of the advance tier of bits 23, and projecting forwardly of the tier of bits on the advance step 29 into closer proximity to the material to be bored than the next preceding tier of bits, as shown in Figure 3. The block 26 also has a trailing central plane face 33 with inwardly inclined faces 34 extending from opposite sides thereof. The faces 33 and 34 are spaced in advance of the preceding faces 29 and 31 in an axial direction toward the working face, a distance sufficient to support the trailing tier of bits to the proper cutting depth or gage, determined by the rate of advance of the boring head into the material being mined.

The bits 23 are mounted in the mounting block 26 in tapered sockets 35 extending axially within said mounting block from the faces 29, 30, 31, 32, 33 and 34 of said mounting block and opening at their inner ends into transversely drilled holes 36, accommodating the cleaning of dirt and dust from said socket and the engagement of the inner ends of a shank 37 of a bit 23 by a pry bar or the like, to pry said bits from the socket for renewal when necessary.

Each bit 23 is of a similar construction having a tapered shank 37 conforming to the taper of the socket 35, and relieved between the ends of the shank to prevent wedging or freezing of the shank within its socket. A head 38 having a hardened cutter tip 39 bonded to the forward outer end portion thereof extends from the outer end of the shank 37.

Referring now to Figure 3 illustrating the operation of cutting in a coal face 39, it may be seen that the bits 23 in the leading step or tier clear the coal face or inner end of the kerf being cut except when a hard inclusion, such as a sulphur ball 40 is encountered. When a bit 23 in the leading tier of bits may encounter a sulphur ball it will momentarily halt the advance of the cutter and then more or less shave the outer surface of the sulphur ball, allowing the bits in the next succeeding tier of bits to engage the sulphur ball and momentarily halt the advance of the cutter and then make a second shaving cut along the face of the sulphur ball. The bits 23 of the trailing tier of bits will then again engage the sulphur ball and momentarily halt the advance of the cutter and then make a third shaving cut along the face of the sulphur ball with the result that the sulphur ball may be cut through by a number of thin shaving cuts by the successive tiers of the bits coming into engagement therewith as the cutter rotates.

It should here be understood that the gage of the trailing tier of bits and the depth of cutting through the sulphur ball is less than the depth of cutting through the softer coal, since as each bit or tier of bits engages the harder sulphur ball, the advance of the cutter is momentarily retarded with a resultant reduced cutting depth for the trailing tier of bits than if the advance of the cutter was at its normal feeding speed.

It should also be noted that the kerf cut in the coal face 39 is an annular kerf parallel to the resultant of the driving and feeding forces of the cutter. Thus, since the feeding or penetrating velocity varies with the hardness of the coal, the cut in the coal may assume a variety of angles with respect to the longitudinal axis of the cutter. The correct measurement of bit penetration, therefore, is by projecting the bit profiles in a plane normal to the direction of cutter travel, and since this direction varies with the hardness of the material, the stepped or tiered arrangement of the bits, with the leading bits held in reserve and the trailing bits cutting to the required cutting depths, is effective to provide greater bit penetration in the softer coal and less bit penetration in the harder inclusions, due particularly to the retarding of the advance of the bits upon encountering the hard inclusions.

Figure 4:
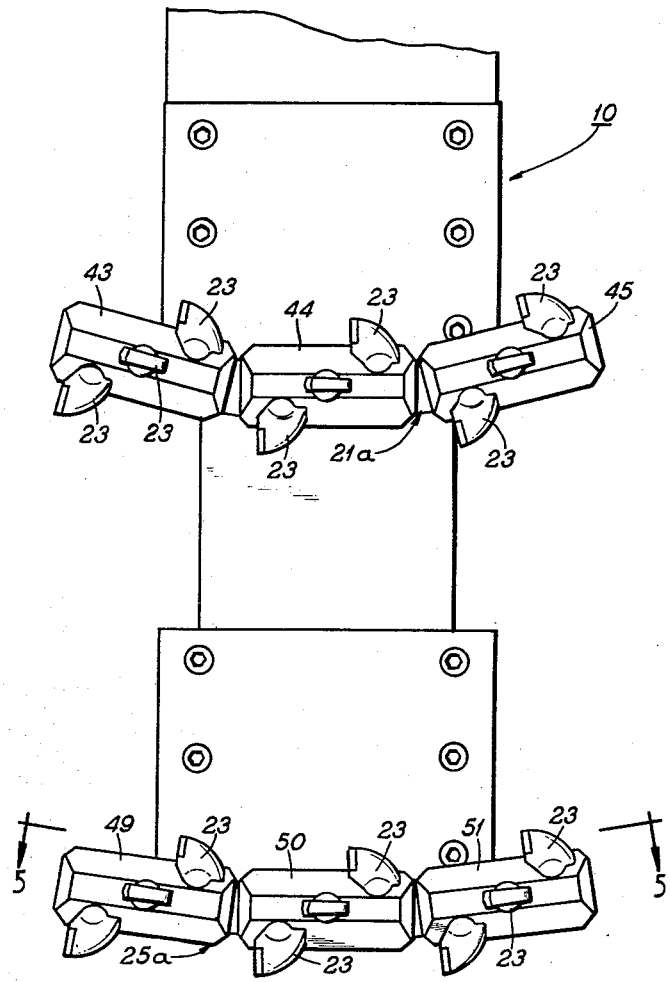
Figure 4 is a fragmentary front elevational view of a boring head similar to that shown in Figure 1, but showing individual mounting blocks for each repeating bit pattern.
Figure 5:
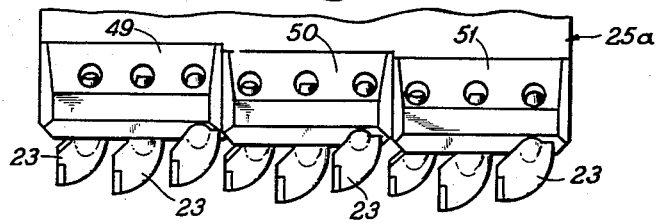
Figure 5 is a plan view of the outer cutter shown in Figure 4 looking in the direction of the arrows 5—5 of Figure 4.

In the modified form of the invention illustrated in Figures 4 and 5, the boring head 10 is similar to the boring head shown in Figure 1 and has radially spaced cutters 21a and 25a similar to the radially spaced cutters 21 and 25 of the boring head shown in Figure 1, each of which carries a plurality of stepped tiers of cutter bits 23. The respective radially spaced cutters 21a and 25a have a series of blocks 43, 44 and 45 and 49, 50 and 51 projecting forwardly therefrom.

As shown in Figure 4 each mounting block 43, 44 and 45 forms a support for a pattern of angularly disposed bits 23 carried therein and each successive mounting block is spaced a greater distance outwardly from the cutter 21 than the preceding block, from the leading to the trailing end of said cutter. The mounting blocks 43, 44 and 45 are shown in Figure 4 as being angularly disposed with respect to each other with the center lines thereof extending generally along the arc of cutting of the cutter to position the cutter bits 23 to cut an annular kerf in the coal face about the axis of rotation of the boring head 10.

Figure 2:
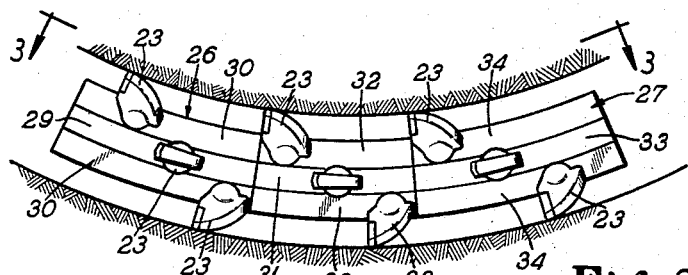
Figure 2 is a front view of one of the cutters illustrated in Figure 1, showing the bits supported in a repeating pattern arranged in tiers in accordance with the principles of the present invention.

The mounting blocks 49, 50 and 51 on the cutter 25a are similar to the mounting blocks 43, 44 and 45, but are angularly disposed with respect to each other to conform to the increased cutting arc of the cutter 25a over the arc of cutting of the cutter 21a. The mounting blocks 49, 50 and 51 like the mounting blocks 43, 44 and 45 are in stepped relation with respect to each other, each step of which is axially spaced in advance of the next preceding step toward the face to be cut to space the trailing step in such relation with respect to the preceding steps as to support the cutter bits thereon at the proper cutting gage, with the bits supported on the preceding steps supported at less than cutting gage and normally held in reserve, as in the form of the invention shown in Figures 1, 2 and 3.

The advantage of the individual blocks for each tier and pattern of bits is that the blocks for each cutter may readily be arranged to fit the different cutting radii of the various cutters.

In the embodiment of the invention illustrated in Figures 6 and 7, individual blocks 53 are shown as being provided for individual cutter bits 55 and mounted on cutters 21c and 25c to conform to the cutting radii of said cutters.

Each bit 55 is shown as having a rectangular shank 56 having a tapered rear side 57 insertable within a socket 59 having a tapered rear wall 60 conforming to the taper of the tapered rear side 57 of the shank 56. Openings 61 are provided in the individual blocks 53 to afford access to the inner ends of the shanks 56, to enable the bits 55 to be removed by a pry bar or the like. The particular bit mounting means and detailed structure thereof is the subject matter of an application Serial No. 703,117 filed December 16, 1957 by Anthony R. Biedess, which issued as Patent No. 2,899,187 on August 11, 1959.

In this embodiment of the invention, the cutter blocks and bits may readily be arranged to fit different cutting radii and the width of the cut or the number of bits in the bit pattern for each step or tier of bits may readily be varied to suit various cutting conditions.

It may here be seen that while we have shown only three tiers of bits, the number of tiers of bits employed may be increased with a resultant decrease in the thickness of the shaving cuts cut from the inclusions and making it possible to more easily cut through large inclusions without changing the feeding speed of the cutter. Two and three tiers of cutters, however, have proven to be satisfactory where the feeding speed of the boring head can be adjusted when difficult cutting is encountered.

It should further be understood that where the cutting is relatively soft with no inclusions, that the entire feeding force applied to the cutter is distributed to effect optimum bit penetration, the trailing tier of bits being the first tier to penetrate the material to the full depth and thereby producing relatively large lumps of coal. The next preceding tier of bits will then begin to penetrate the coal when the trailing tier of bits has penetrated the coal to the required cutting depth. When this tier of bits has penetrated to its cutting depth the advance tier of bits will begin to penetrate the coal and cut clearance for the trailing tiers of bits. The spacing between the tiers of bits on a line normal to the direction of bit travel coupled with the rate of feed of the cutters thus determines the depth of cutting or the gage of a succeeding tier of bits in coal of such uniformity that an excess of feeding force is available.

It should also be understood that while the particular cutting means shown and described are cutter bits, that the cutting means need not be cutter bits, but may be various other forms of cutting means, and may also be a combination of cutter bits and other forms of cutting means.

While we have herein shown and described several embodiments of our invention, we wish it to be understood that various other modifications and variations of the invention may be effected without departing from the spirit and scope of the novel concepts of the invention as defined by the claims appended hereto.

We claim as our invention:

1. In a rotary cutting device for coal and the like, a rotatable cutter, a plurality of cutter bits, mounting means for mounting said bits on said cutter in adjacent series, said mounting means being effective to determine the location of the bits with respect to the cutter and with respect to each other, said mounting means locating certain proximate bits in a pattern effective to cut beyond the perimeter of the cutter and locating certain succeeding bits in a repeating pattern, succeeding patterns of bits being disposed in tiers, whereby the projection of a cutting edge of a bit on a plane normal to the direction of cutter travel extends beyond the cutting edge of a corresponding bit of the same series in the next preceding tier.

2. In a rotary boring device for cutting mineral substances, such as coal and the like, a rotary cutter having a cutter bit mounting means extending forwardly therefrom, for mounting thereon a plurality of cutter bits in repeating patterns in a series of succeeding tiers, comprising a series of mounting blocks, each mounting block having a plurality of bit receptacles disposed therein arranged in a definite pattern, and adjacent of said mounting blocks being supported in tiered relation with respect to each other spaced along a line perpendicular to the direction of travel of said mounting blocks toward the working face with the trailing mounting blocks spaced closer to the working face than the leading mounting blocks, and supporting the cutter bits in the leading mounting blocks of a series of mounting blocks in increments of cutting depths of the cutter, less than the cutting depth of the bits in the trailing mounting blocks of said series of mounting blocks.

3. A rotary boring device for cutting a mineral substance such as coal and the like, comprising a radially extending rotatable arm having a cutter extending forwardly therefrom toward a face to be cut, a plurality of cutter bits adapted to be carried by said cutter, means for mounting said cutter bits on said cutter in succeeding tiers comprising a mounting block extending forwardly of said cutter and having a stepped forward face extending generally perpendicular to the axis of said arm, each step of said mounting block having a plurality of bit receptacles therein arranged in a predetermined pattern, for supporting said cutter bits in repeating bit patterns in tiered relation with respect to each other from the leading to the trailing end of said cutter, and positioning the trailing tier of cutter bits at full cutting depth and the preceding tiers of cutter bits at less than full cutting depth.

4. In a rotary boring device for coal and the like, a radial arm having a cutter projecting forwardly therefrom, a plurality of cutter bits adapted to be carried by said cutter, bit mounting means extending forwardly from said cutter including a plurality of mounting blocks arranged in annular relation with respect to each other in the general form of the arc of travel of said cutter, each of said mounting blocks having a plurality of bit receiving sockets therein extending generally parallel to the axis of rotation of said cutter, the leading of said mounting blocks being so spaced with respect to the trailing of said mounting blocks as to normally support its bits out of cutting relation with respect to the material being cut, an intermediate of said mounting blocks being spaced forwardly of the leading of said mounting blocks, and the trailing of said mounting blocks being spaced forwardly of the intermediate of said mounting blocks and having a forward face so spaced with respect to said cutter as to support its bits at cutting gage.

5. In a rotary boring device for coal and the like, a radial arm having a cutter projecting forwardly therefrom, a plurality of cutter bits adapted to be carried by said cutter, and bit mounting means on said cutter comprising a plurality of individual mounting blocks for each bit, arranged in angular relation with respect to each other in the general form of the arc of travel of said cutter, each of said mounting blocks having a bit receiving socket therein opening to the forward face thereof, and certain succeeding tiers of said mounting blocks being spaced forwardly of the preceding of said mounting blocks and being so positioned on said cutter as to support said bits in a series of tiers, with the trailing tier of bits spaced forwardly of the leading tier of bits and the leading tier of bits being so spaced with respect to the trailing tier of bits as to be held in reserve during normal cutting, and to effect a series of shaving cuts on hard inclusions and the like encountered in the coal face.

6. In a rotary boring device for cutting mineral substances, such as coal and the like, a rotary cutter support having a series of mounting blocks extending axially forwardly therefrom, for mounting a plurality of cutting means thereon in repeating patterns in a series of tiers, said mounting blocks being supported therein in a definite pattern, and adjacent of said mounting blocks being supported in tiered relation with respect to each other and spaced axially of said cutter support toward the working face with the trailing mounting blocks of said series of mounting blocks spaced closer to the working face than the leading mounting blocks of said series of mounting blocks, and supporting the cutting means in the leading mounting blocks of said series of mounting blocks in increments of cutting depths less than the cutting depths of the cutting means in the trailing mounting blocks of said series of mounting blocks.

7. In a rotary cutting device for coal and the like, a rotary cutter support, a plurality of cutting means, mounting means for mounting said cutting means on said cutter support in adjacent series, said mounting means being effective to determine the location of the cutting means with respect to the cutter support and with respect to each other, and locating certain cutting means in a cutting pattern effective to cut beyond the perimeter of the cutter support and locating certain other cutting means in a repeating pattern, succeeding patterns of cutting means being disposed in tiers, whereby the projection of a cutting edge of a cutting means on a plane normal to the direction of cutter support travel extends beyond the cutting edge of a corresponding cutting means of the same series in the next preceding tier.

8. In a rotary boring device for coal and the like, a rotable cutter support, a plurality of cutting means adapted to be carried by said cutter support, a plurality of mounting blocks for said cutting means arranged in the general form of the arc of travel of said cutter support, each of said mounting blocks having a cutting means mounted thereon and extending generally axially of the axis of rotation of said cutter support, the leading of said mounting blocks being so spaced with respect to the trailing of said mounting blocks as to normally support its cutting means out of cutting relation with respect to the material being cut, and the trailing of said mounting blocks being spaced axially forwardly of the leading of said mounting blocks, and being so spaced with respect to said cutter support as to support its cutting means at cutting gage.

References Cited in the file of this patent
UNITED STATES PATENTS

| | | |
|---|---|---|
| 1,862,814 | Wright et al. | June 14, 1932 |
| 2,832,579 | Barrett | Apr. 29, 1958 |